United States Patent Office 2,835,530
Patented May 20, 1958

2,835,530

PROCESS FOR THE CONDENSATION OF ATMOSPHERIC HUMIDITY AND DISSOLUTION OF FOG

Karl Schneider, Basel, Switzerland

No Drawing. Application May 13, 1955
Serial No. 508,301

2 Claims. (Cl. 299—28)

This invention relates to the condensation or dissolution of fog, mist and clouds, and to the formation of rain.

It is known that mist and clouds are of the same composition, namely an accumulation of very fine drops of water mixed with water vapour, which form together the atmospheric water content. The latter, depending on the density of the cloud or mist, consists in 500 to 1000 small drops of water per ccm, which are so small and of so little weight that they remain suspended in the air, thus forming mist and clouds.

As a feature of this invention a wetting agent and a condensation nucleus are brought to reaction and the product of this reaction is vaporised in the air in a way to dissolve clouds and mist or to produce rain. This vaporization may be effected by spraying.

As another feature of this invention, the condensation nucleus consists of a peroxide compound, including hydrogen peroxide. In low temperatures, a protectant against freezing can be added.

According to the process in question, condensation of the atmospheric water content, that is, the dissolution of fog through accumulation of water on the atmospheric humidity follows, independent of any temperature influence. This is attained since the water globules as well as the water vapor floating in the atmosphere are sprayed at any desired height and are thereby unified and combined with condensation nuclei and a wetting agent which reduced surface tension.

Through that unification, the individual fog water globules as well as the atmospheric water vapour of which fog and cloud consist, continuously increase in size, naturally become heavier and begin to sink, whereby the layer of atmospheric humidity beneath is unified through contact and is also compelled to follow the course of the process.

Because of the use of a wetting agent which reduces surface tension the unified atmospheric humidity shows slak water and this causes an automatic fusion of the water globules in one another to take place. By the use of a condensation nucleus that is, the nucleus producing agent the moisture content of the atmosphere is combined and with it the individual tiny water globules and the water vapour which float in the atmosphere, are unified and precipitated.

The condensation, that is dissolution follows naturally from above to below on to the earth's surface and inasmuch as the dissolution process can be discharged at any desired height in the atmosphere, the condensed water by reason of its greater weight can no longer float in the atmosphere.

Through the nucleus charge former, the condensation nuclei which are already present and always to be found in the atmosphere, are also drawn into the process and utilised.

The materials described can as a result of research be sprayed either alone or combined with one another for the purpose of dissolution at any desired height in the atmosphere and this can be done effectively by using a sraying apparatus from an aeroplane or by detonation from special rockets or balloons.

The condensation material, that is the dissolution material can be used in every aggregate form whether solid, fluid, gas or in vapour form and also in aqueous solution.

The effective characteristics of the primary materials are founded through surface tension reduction, condensation nucleus production and hygroscopicity.

The material used can be activated through electrical charges, ionization or ozonization.

The use of the process is economic and cheap and is also suitable as a natural course for the production of artificial rain.

Suitable wetting agents are, for instance, fatty alcohol sulfonates or the like; said wetting agents reduce the surface tension of the small suspended droplets and cause their confluence to larger droplets which are precipitated by the action of agents forming condensation nuclei. Said latter agents can be applied preferably together with the wetting agents or also separately; as nuclei forming agents, I use peroxides, for instance hydrogen peroxide and compounds thereof, such as the perborates or percarbonates of sodium, barium and the like.

A particular advantage of my method is that it is to a large extent independent of the temperature of the clouds or fog. The wetting and condensing agent may therefore be introduced into the clouds at any height; they may be used in the solid, liquid, or vaporized state, or as solutions, preferably in the form of sprays.

I claim:

1. A method of producing precipitation of water droplets suspended in natural clouds and fog, comprising introducing into said clouds and fog a wetting agent and a peroxide compound in an amount sufficient to produce condensation of said suspended water droplets.

2. A method of producing precipitation of water droplets suspended in natural clouds and fog comprising introducing into said clouds and fog a fatty alcohol sulfonate and hydrogen peroxide in an amount sufficient to produce condensation of said suspended water droplets.

References Cited in the file of this patent

UNITED STATES PATENTS

| | | |
|---|---|---|
| 1,103,490 | Cordray | July 14, 1914 |
| 1,928,963 | Chaffee | Oct. 3, 1933 |
| 2,052,626 | Houghton | Sept. 1, 1936 |

OTHER REFERENCES

"Chemical Reviews," vol. 44, "The Formation of Ice Crystals in the Laboratory and the Atmosphere," by V. J. Schaefer, pages 291–320; pages 312, 313 and 314 only cited.